April 30, 1957 S. M. GRISWOLD 2,790,189
METHODS OF MAKING RIBBED INSOLES FOR WELT SHOES
Filed July 1, 1953 2 Sheets-Sheet 1

Inventor
Stanley M. Griswold
By his Attorney

April 30, 1957   S. M. GRISWOLD   2,790,189
METHODS OF MAKING RIBBED INSOLES FOR WELT SHOES
Filed July 1, 1953   2 Sheets-Sheet 2

Inventor
Stanley M. Griswold
By his Attorney

2,790,189

METHODS OF MAKING RIBBED INSOLES FOR WELT SHOES

Stanley M. Griswold, Newton, Mass., assignor to B. B. Chemical Co., Boston, Mass., a corporation of Massachusetts Application July 1, 1953, Serial No. 365,400

5 Claims. (Cl. 12—146)

This invention relates to methods of making ribbed insoles for use in the manufacture of welt shoes.

The present invention is an improvement on the method disclosed in Letters Patent of the United States No. 2,538,776, granted January 23, 1951, in my name.

In my prior patent, the outer face of the insole including the rib is covered with an all-over layer of stiffened canvas such as Gem duck which is relatively expensive. An object of the present invention is to render the insole less expensive by avoiding the use of canvas except in the rib and providing an all-over layer except for the rib of cheap sheet material.

Such cheap material may be Onco or Texon, both commercial products made of wood pulp with a latex binder.

In practising the invention, a piece of such material, for example Onco, larger than the insole desired is provided and a slit or slot is cut through the Onco corresponding to the shape of an insole rib. Then a prefabricated ribbed strip having a flange projecting from the rib at each side of its base is provided and the rib of such strip is forced through the slit or slot in the Onco as far as permitted by its flanges. A body portion of suitable material, such as leather, larger than the insole is cemented and laid upon the Onco on that side thereof on which the flanges of the ribbed strip are exposed. Pressure is applied to cause the assembly to become a unified whole, and the Onco layer and the body layer, also including perhaps a portion of the outer flange, are trimmed at a suitable distance from the rib to form a ribbed insole.

Conveniently a matrix such as that disclosed in Letters Patent of the United States No. 2,577,750, granted December 11, 1951, in my name and that of Hans C. Paulsen, may be used. This matrix comprises an insole-shaped block of uniform thickness having in each flat face a rib groove corresponding in depth and width respectively to the height and thickness of the rib to be used. The matrix has a groove in its edge face the bottom of which is at a uniform distance from the rib groove. A piece of sheet material, such as Onco, is fastened to one flat face of the matrix and, with a suitable tool, an opening is formed through the Onco, the opening being preferably a slot corresponding in width to the width of the groove, the slot extending throughout the extent of the groove. A prefabricated ribbed strip, which may be prepared in a variety of forms but all having a rib and a flange at each side of the rib, which flanges are cemented on both sides, has its rib portion passed through the slot in the Onco layer and its flanges pressed against the outer surface of the Onco layer, which surface is also precemented. The above-described operation is performed on the opposite face of the matrix. Then two body layers of the size of the Onco layer are precemented on one side and one body layer is placed on one side of the matrix with its cemented face in contact with the Onco layer. The other body layer is similarly applied to the Onco layer on the other side of the matrix. Pressure is then applied to cause each body layer to adhere to one of the Onco layers and to the flanges of the ribbed strip lying upon it. The portions of the body layer and the Onco layer, and perhaps at least a portion of the outer flange extending beyond the matrix, are then trimmed to the shape of the matrix, using the edge face as a guide. The insoles are then pulled off the matrix, a pair of mating insoles being thus produced.

In the drawings—

Figure 1:
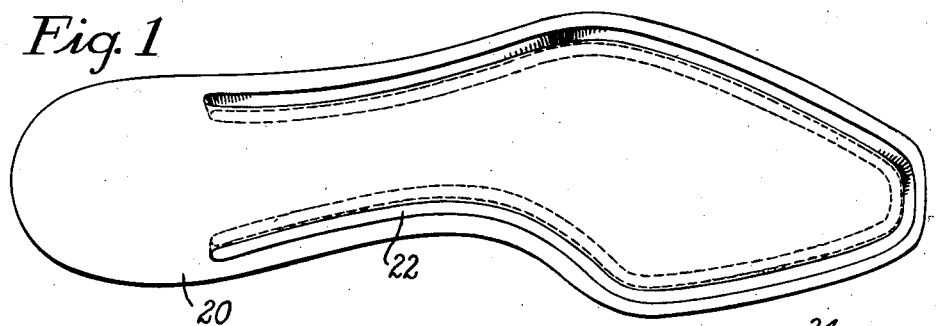
Fig. 1 is a plan view of a matrix.
Figure 2:
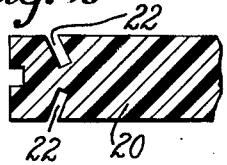
Fig. 2 is a fragmentary sectional view of a matrix.

In practising the present invention, it is convenient to provide a matrix such as that disclosed in the patent last referred to and which, as illustrated in Fig. 1, consists of an insole-shaped block 20 of wood, fiber or plastic, having in each flat face a groove 22 of a depth and width corresponding respectively to the height and thickness of the desired insole rib, the walls of the groove, being preferably inclined (Fig. 2) inwardly of the matrix at an angle of about 25° to a line perpendicular to the flat face of the matrix at an edge of the groove.

Figure 3:
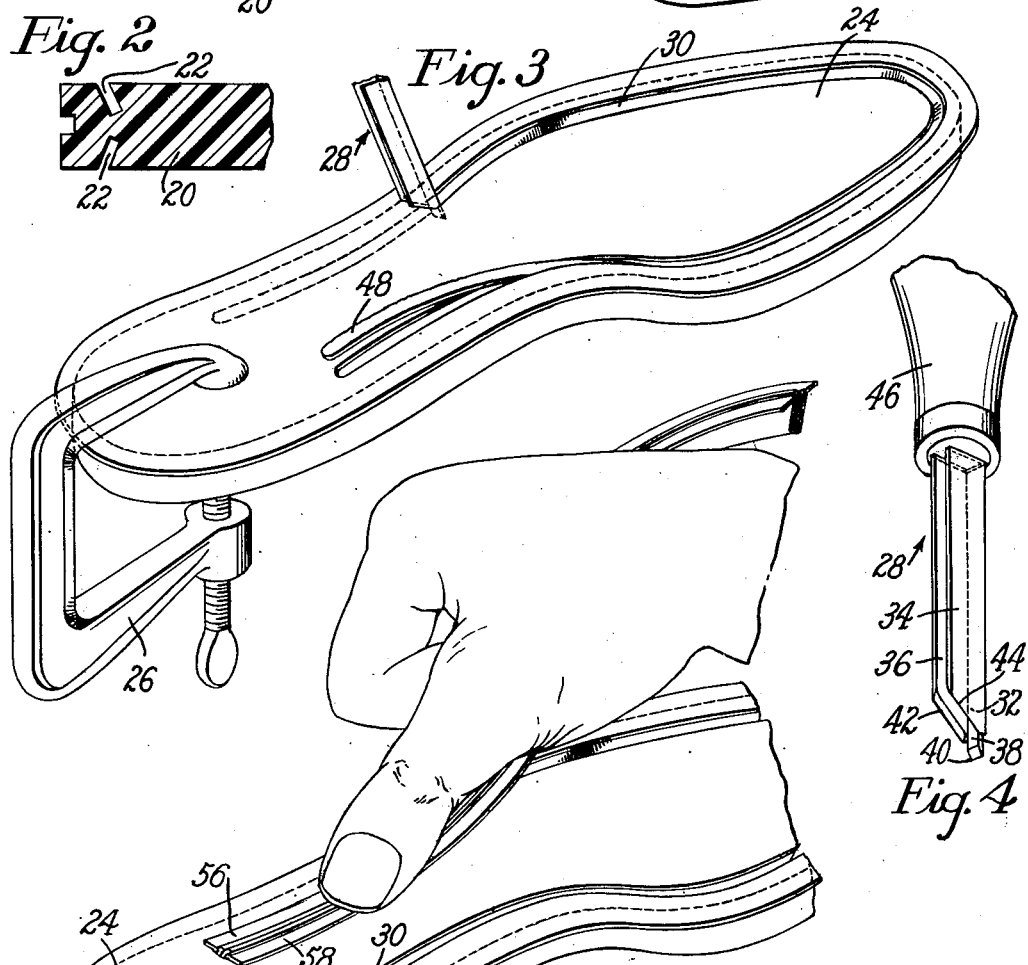
Fig. 3 is a perspective view showing a piece of sheet material clamped to the matrix and the slot being formed by use of a tool.

A piece of sheet material which may be latex-impregnated wood fiber 24, such as Onco or Texon cemented on its outer face, is laid upon the matrix, as shown in Fig. 3, and preferably fastened or clamped thereo, for example by a C-clamp 26. Then, with a suitable cutting tool such as a chisel-like tool 28, a slot 30 is cut in the piece of Onco throughout the extent of the groove 22.

Figure 4:
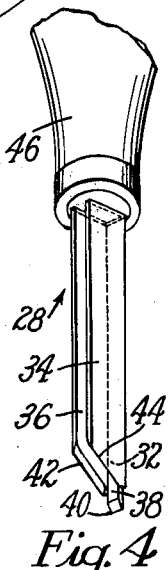
Fig. 4 is a considerably enlarged perspective view of a tool that may be used.

The tool may consist of a piece of sheet steel formed as a channel member (Fig. 4) having a bottom 32 and sides 34, 36. The bottom is extended beyond the sides to form a pilot 38 having a chisel-like edge 40. The sides adjacent to the pilot are upwardly and outwardly inclined with respect to the bottom 32 and are beveled on their inner surfaces to form inclined cutting edges 42, 44. The tool has a handle 46 by which it may be manipulated first to cause the pilot 38 to cut through the Onco at the end of the groove 22 and then, by greater or less reciprocative movement of the tool in the plane of the groove, the edges 42, 44 are caused to cut the Onco progressively along the sides of the groove to form a strip 48 (Fig. 3). When the opposite end of the groove is reached the pilot is used to sever the end of the strip 48, which is then removed and discarded.

Figure 6:
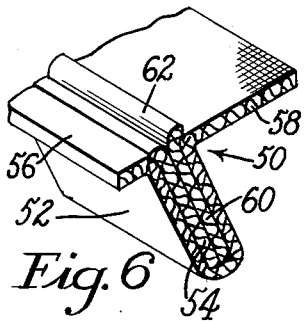
Figs. 6, 7, 8 and 9 are fragmentary perspective views of various prefabricated ribbed strips that may be employed.
Figure 7:
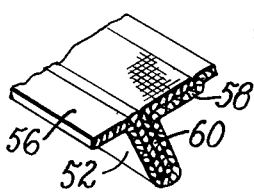

A prefabricated ribbed strip 50 (Fig. 6) of indefinite length is made up of a strip of canvas 52 cemented on both sides and wide enough to cover a core piece 54 and form flanges 56, 58, one on each side adjacent to one edge of the core piece. The core piece 54 may be of canvas impregnated with a condensation product of phenol formaldehyde and may have a reinforcing piece 60 of canvas coated with coumarone indene resin cemented thereto with latex, as disclosed in my Patent No. 2,623,306. The reinforcing piece 60, however, has preferably a very narrow flange 62 instead of a wide one, as shown in Fig. 6, although the construction of Fig. 7, otherwise similar, may be used if desired. The narrow flange 62, however, enables the flanges 58 to be bonded more completely to the body portion of the insole.

Figure 8:
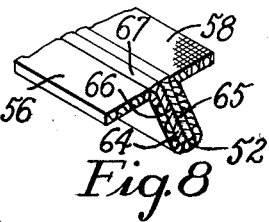

The form of ribbed strip shown in Fig. 8 may be employed wherein the fold of the usual canvas 52 encloses a core piece composed of two strips 64, 65 of Onco or similar material cemented together with sodium silicate 66 which stiffens the core piece to withstand widthwise pressure but does not interfere with the penetration thereof by the needle. The strips 64, 65 may be made wider than the depth of the groove 22 so that the portion of the strips extending beyond the flanges may be upset or headed over as at 67 to provide a better base for the rib when secured to a body portion.

Figure 9:
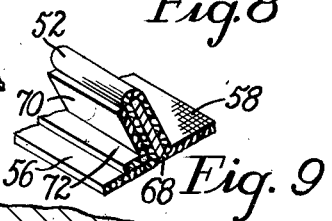

In Fig. 9 a ribbed strip is shown having a single strip 68 forming the core piece in the fold of the usual canvas 52. Such a ribbed strip may be employed by itself under some conditions and, as shown, if desired a reinforcing strip 70 of canvas or the like may be cemented to the inner face of the rib, the strip preferably being wide enough to form a flange 72 at the base of the rib.

Figure 5:
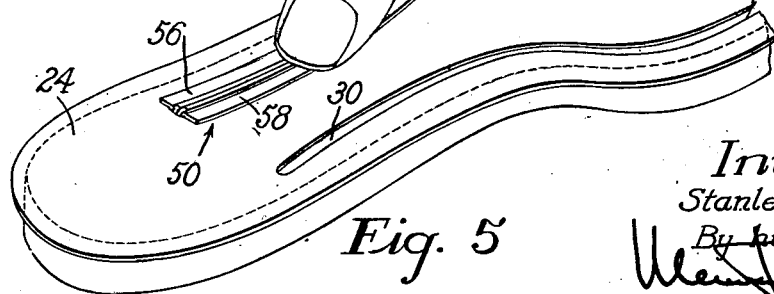
Fig. 5 is a perspective view illustrating the operation of inserting the rib of a prefabricated ribbed strip through the slot in the sheet material shown in Fig. 3.

The rib portion of any one of the ribbed strips described is introduced through the slot 30 into the grooves 22 of the matrix, as shown in Fig. 5, with the narrow flange 56 extending outwardly of the matrix, this operation being performed throughout the extent of the slot 30 and groove 22 and the ribbed strip cut off.

Figure 10:
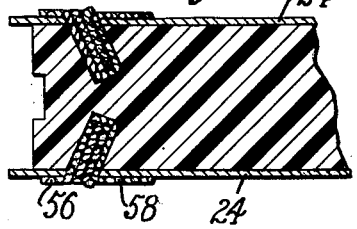
Fig. 10 is an enlarged fragmentary, sectional view of a matrix after the sheet material has been applied to each side of the matrix and the ribs of the ribbed strips inserted through the slots in the sheet material.
Figure 11:
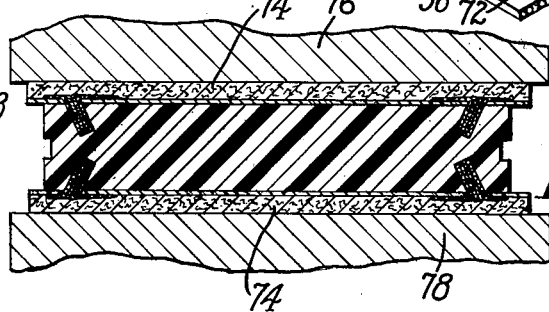
Fig. 11 is a sectional view illustrating the application of pressure to the assemblage of Fig. 10 after the body portion has been applied to each side of the matrix.
Figure 13:
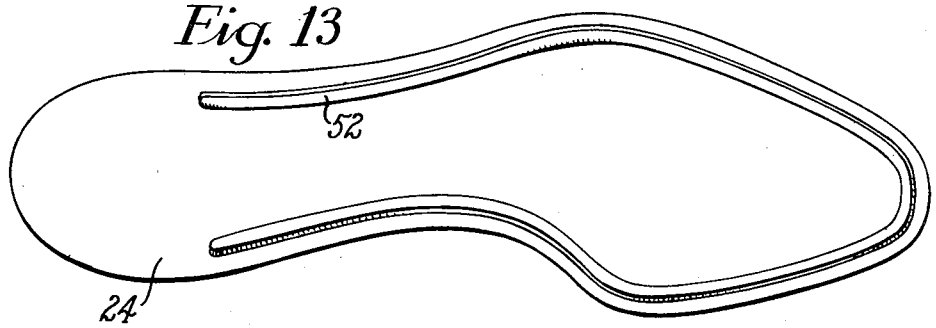
Fig. 13 is a plan view of the ribbed side of one of the insoles after removal from the matrix.
Figure 12:
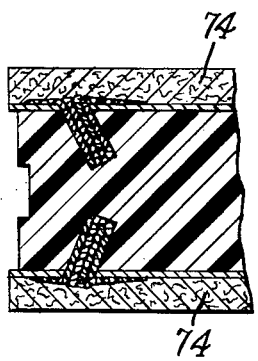
Fig. 12 is an enlarged fragmentary section of the matrix and insoles after trimming the insoles to the shape of the matrix.

The operations of applying an all-over layer 24 of Onco, forming the slot and inserting the rib of the ribbed strip are performed on the opposite side of the matrix, as indicated in Fig. 10. A precemented body portion 74 is then laid on each side of the matrix, as illustrated in Fig. 11, and the assembly subjected to pressure between rolls or platens 76, 78. The portions of the body portion 74 and of the Onco layers 24 which project beyond the matrix are then trimmed off (Fig. 12) utilizing as a guide the edge face of the matrix. The insoles are then removed from the matrix, one being as shown in Fig. 13 and the other being exactly similar thereto except that it is like a mirror image of the one shown. Thus, an exactly mating pair of insoles is produced.

It is to be understood that the invention is not limited to cutting a slot in the Onco to receive the rib of the ribbed strip but that a slit along the middle of the groove 22 in the matrix or along either side of the groove may be utilized to allow the rib to be forced through the Onco into the groove 22; also, that the terms "Onco" and "Texon" used to designate the all-over layer 24 are not restrictive, but that any suitable material may be employed.

It will be seen that, since the strip 52 is cemented on both sides, the core piece is cemented on both sides and the meeting faces of the body portion 74 and the sheet material 24 are cemented, the various parts are bonded together into substantially an integral whole, the canvas 52 being bonded to the core piece, and the flanges 56, 58 being bonded on one side to the sheet material 24 and on the other side to the body portion 74. While the canvas strip is cemented on both sides for convenience, it is necessary to cement only the inner side of the strip and both sides of the flange. The cement on the outer side of the rib, however, does no harm and that on the inner side of the rib is useful when the reinforcing strip 70 is employed.

The novel insole made in accordance with the method of the present invention forms the subject-matter of a divisional application Serial No. 599,811, filed July 24, 1956, in my name.

Having thus described my invention, what I claim as new and desire to secure by Letters Patent of the United States is:

1. That improvement in methods of making insoles which comprises providing a flanged ribbed strip consisting of a core piece and a strip of cemented canvas folded about one edge and two sides of said core piece, providing a layer of sheet material having a rib receiving opening, passing the rib of the flanged ribbed strip through said opening, cementing a body layer to the layer of sheet material and the flanges of the strip, and trimming both layers to insole shape.

2. That improvement in methods of making welt insoles which comprises providing an insole-shaped matrix with a rib-forming groove therein, providing a flanged ribbed strip, laying sheet material on the matrix, cutting an opening in the sheet material opposite the groove, and progressively pushing the rib of the flanged ribbed strip through the opening in the sheet material until the flange engages the sheet material.

3. That improvement in methods of making welt insoles which comprises providing a matrix of the size and shape of an insole having therein a groove corresponding to the desired location of the insole rib, laying a piece of sheet material on the matrix, cutting a slot in the sheet material over the groove, providing a ribbed strip having a flange at each side of the rib at the base thereof, pushing the rib of the strip through the slot in the sheet material, cementing a body portion to the layer of sheet material and to the flanges of the strip, and trimming the body layer and the layer of sheet material to the shape of the matrix.

4. That improvement in methods of making welt insoles which comprises providing an insole-shaped matrix having a rib-receiving groove therein, applying a layer of sheet material over the matrix, providing an opening in the sheet material over the groove, providing a ribbed strip having a flange at each side of the rib, progressively pushing the rib of the strip through the opening in the sheet material into the groove of the matrix as far as permitted by the flanges, and cementing a body layer to the sheet material and to the flanges.

5. That improvement in methods of making welt insoles which comprises providing a matrix having flat parallel faces of the shape and substantially the size of the insole desired and having in each flat face a groove corresponding in depth, width and location to the height, thickness and location of the desired rib, securing a layer of sheet material to one flat face of the matrix, cutting a slot in the layer of sheet material over the groove, providing a ribbed strip having a flange at each side of the rib, pushing the rib of the strip through the slot in the sheet material into the groove of the matrix until its flanges engage the sheet material, repeating the operations on the opposite side of the matrix, applying a cemented body layer to the layer of sheet material on each side of the matrix, applying pressure to the assemblage to cause the layers to adhere, and trimming the sheet material and body layer to the shape of the matrix.

References Cited in the file of this patent

UNITED STATES PATENTS

| | | |
|---|---|---|
| 1,217,215 | Prenzel | Feb. 27, 1917 |
| 1,296,894 | Winslow | Mar. 11, 1919 |
| 1,298,156 | Arlidge | Mar. 25, 1919 |
| 1,895,709 | Emerson | Jan. 31, 1933 |
| 1,896,531 | Valentine | Feb. 7, 1933 |
| 2,203,822 | Hyman | June 11, 1940 |
| 2,352,715 | Jalbert et al. | July 4, 1944 |
| 2,398,277 | Ayers | Apr. 9, 1946 |
| 2,538,776 | Griswold | Jan. 23, 1951 |
| 2,548,266 | Katz | Apr. 10, 1951 |
| 2,623,306 | Griswold | Dec. 30, 1952 |